US007683785B2

(12) United States Patent
Johnson

(10) Patent No.: US 7,683,785 B2
(45) Date of Patent: Mar. 23, 2010

(54) RF TAGS

(75) Inventor: Daniel R Johnson, Malvern (GB)

(73) Assignee: Qinetiq Limited, London (GB)

( * ) Notice: Subject to any disclaimer, the term of this patent is extended or adjusted under 35 U.S.C. 154(b) by 247 days.

(21) Appl. No.: 11/795,286

(22) PCT Filed: Jan. 17, 2006

(86) PCT No.: PCT/GB2006/000147

§ 371 (c)(1),
(2), (4) Date: Jul. 16, 2007

(87) PCT Pub. No.: WO2006/077391

PCT Pub. Date: Jul. 27, 2006

(65) Prior Publication Data

US 2007/0285252 A1 Dec. 13, 2007

(30) Foreign Application Priority Data

Jan. 21, 2005 (GB) ................................ 0501199.4

(51) Int. Cl.
*G08B 13/14* (2006.01)
*H01S 4/00* (2006.01)

(52) U.S. Cl. .............. 340/572.1; 340/572.5; 340/572.9; 29/592.1

(58) Field of Classification Search ....................... None
See application file for complete search history.

(56) References Cited

U.S. PATENT DOCUMENTS 4,797,785 A 1/1989 Jorgensen (Continued)

FOREIGN PATENT DOCUMENTS

DE 36 02 848 8/1987

(Continued)

OTHER PUBLICATIONS

International Search Report mailed Apr. 19, 2006.

(Continued)

*Primary Examiner*—Julie Lieu
(74) *Attorney, Agent, or Firm*—Nixon & Vanderhye, P.C.

(57) ABSTRACT

A single sided RF tag suitable for use for electronic article surveillance comprises a tuned circuit formed on one side of a substrate. Provided by a deposited first conducting layer which comprises an inductive coil, which behaves as an antenna and is electrically connected to a first capacitor plate and a connection means to connect to a second conducting layer. A low dissipation factor dielectric layer is deposited onto said first conducting layer. A second conducting layer comprising at least one capacitor and a connection means to electrically connect to the first conducting layer is deposited on the dielectric layer. The second capacitor plate is substantially co-located above the first capacitor plate, to form the capacitor. The capacitor and coil together form a resonant circuit. The circuit pattern for the first and second layer may be formed by known metal printing techniques, such as, for example the use of a catalytic seed layer which is deposited by a pattern transfer mechanism into the circuit pattern. Alternatively the circuit pattern may be formed by standard photolithography etch techniques to reveal a circuit pattern from a metallised surface. The tag will preferably incorporate known methods of fusing to deactivate or detune the tag, to permit removal of articles from an enclosed area. The substrate may further include a second RF tag tuned to an alternative frequency on the opposite side of the substrate. Alternatively a plurality of tags may be built up in successive layers on one or both sides of the tag.

16 Claims, 1 Drawing Sheet

U.S. PATENT DOCUMENTS

| | | | | |
|---|---|---|---|---|
| 5,442,334 | A * | 8/1995 | Gallo et al. | 340/572.3 |
| 5,446,447 | A * | 8/1995 | Carney et al. | 340/572.4 |
| 5,841,350 | A * | 11/1998 | Appalucci et al. | 340/572.3 |
| 6,407,669 | B1 * | 6/2002 | Brown et al. | 340/572.1 |
| 6,424,262 | B2 | 7/2002 | Garber et al. | |
| 6,693,541 | B2 | 2/2004 | Egbert | |
| 2001/0035822 | A1 * | 11/2001 | Seidel | 340/572.8 |
| 2001/0044013 | A1 * | 11/2001 | McDonough et al. | 428/202 |
| 2003/0052077 | A1 * | 3/2003 | Hanhikorpi | 216/2 |
| 2004/0046665 | A1 | 3/2004 | Narlow et al. | |
| 2004/0177492 | A1 * | 9/2004 | Eckstein et al. | 29/602.1 |
| 2004/0259737 | A1 * | 12/2004 | Baecker et al. | 505/100 |
| 2005/0081374 | A1 * | 4/2005 | Eckstein et al. | 29/825 |
| 2007/0096852 | A1 * | 5/2007 | Lawrence et al. | 333/195 |
| 2007/0113966 | A1 * | 5/2007 | Eckstein et al. | 156/267 |
| 2007/0221729 | A1 * | 9/2007 | Grishin et al. | 235/439 |
| 2008/0060193 | A1 * | 3/2008 | Farnworth et al. | 29/847 |

FOREIGN PATENT DOCUMENTS

| | | |
|---|---|---|
| EP | 0 824 301 | 2/1998 |
| GB | 2 247 594 | 3/1992 |

OTHER PUBLICATIONS

European Search Report dated Jun. 3, 2005.

* cited by examiner

RF TAGS

This application is the U.S. national phase of International Application No. PCT/GB2006/000147 filed 17 Jan. 2006 which designated the U.S. and claims priority to GB 0501199.4 filed 21 Jan. 2005, the entire contents of each of which are hereby incorporated by reference.

The invention relates to radio-frequency (RF) tags which are capable of being detected by an external electric field and in particular to RF tags which can be formed on a single side of a substrate. Such tags are frequently used for Electronic Article Surveillance (EAS) to detect unauthorised articles being removed from enclosed areas such shops or libraries.

One bit RF tags typically comprise a tuned circuit having inductive and capacitor components. A "gate" is arranged at the exit to the enclosed area and coils within the gate generate an electrical field at the resonant frequency of the tag. If the tag passes through the gate the field is disrupted and circuitry attached to the gate detects this disruption and generates a signal which may trigger an alarm. In practice the gate frequency commonly scans frequencies around the expected resonant frequency to allow for manufacturing variation in the tag.

To permit authorised removal the tag is de-activated. For example tags on goods are deactivated at the point of sale, so that only goods which have not been paid for activate the alarm.

DESCRIPTION OF THE PRIOR ART

Known RF tags commonly comprise as the inductive element an antenna coil, typically of a metal such as aluminium or copper. This may be formed on the dielectric substrate by coating the substrate with a metal, applying an etch resist in the pattern of the desired coil and etching away the remaining metal. The etch resist pattern also includes a conducting area electrically connected to the antenna which acts as one plate of the capacitor. On the opposite side of the substrate there is applied, by a similar technique, the second plate of the capacitor substantially aligned with the first plate and connected by a conducting track to a point on the second side of the substrate aligned with the end of the antenna remote from the first plate on the first side of the substrate. An electrical connection is then made between the two sides of the substrate either at the edge or via a through-hole to complete the inductance/capacitance circuit. This through-connection may be made by any conventional means such as soldering, but may simply be effected by crimping the two aluminium tracks so that they form a sound electrical contact.

Alternatively it is known from U.S. Pat. No. 6,373,387 and U.S. Pat. No. 6,407,669 to form the tag on one side of a flexible substrate which is then folded, with a dielectric material in between, to bring into alignment the two capacitor plates. This requires a costly further processing step of aligning and folding the substrate to co-locate the respective capacitor plates. Such a folding step is likely to cause stress to the metal on the surface of the substrate.

It is also known from U.S. Pat. No. 6,693,541 that an antenna connected to a first capacitor plate and two connector pads, joined respectively to the antenna and capacitor plate can be formed on one side of a substrate. A conducting bridging portion, which forms the second capacitor plate, can be fixed over the circuit, connecting the two connection pads. The bridging portion covers part of the antenna and the entire capacitor plate. The conducting bridge must be prepared in a separate process step, and in order to function it is required to contain electrically conducting regions and electrically insulated regions This requires a costly further production step of the bridging portions, and also further alignment and fixing process steps.

RF tags are produced in large numbers and consequently to keep manufacturing costs to a minimum are manufactured such that the general substrate is also used as the dielectric layer which separates the two metal capacitor plates. Whilst this cleverly utilises the materials it also adds to process complexity and cost by having to process both sides of the substrate. It is also necessary to make through-hole connections in the substrate to connect to both of the capacitor plates to form the circuit.

There is therefore a requirement for an RF tag which can be manufactured without depositing conducting material either side of the substrate.

GENERAL DESCRIPTION OF THE INVENTION

Therefore in the present invention methods are described and illustrated where the construction of a complete RFID tag can be achieved on one side of a substrate.

According to the present invention there is provided an RF tag comprising;

an electrically non-conducting substrate having first and second surfaces:

a first conducting layer on the first surface of the substrate;

a dielectric layer covering at least part of the first conducting layer;

and a second conducting layer on the surface of the dielectric substrate remote from the first conducting layer, at least partially located above the first conducting layer and electrically connected to the first conducting layer;

wherein the first or second conducting layers form a tuned RF circuit including at least one coil and at least one capacitor.

The first conductive layer may contain at least one connection means to electrically connect to a second conducting layer.

The inductive coil may be located on either the first or second conducting layer or both. The inductive coil provides the LC circuit with the required inductance and also functions as the antenna to receive and interact with the transmitted RF radiation. The first conducting layer will normally also include the first effective plate of the capacitor forming part of the resonant circuit.

Of particular importance is that the dielectric in RF capacitors must have a low dissipation factor to reduce signal losses, thus making the selection of substrate somewhat limited. For example polyalkenes and other low water absorbing, non-polar plastics are suitable as dielectrics but may cause problems in their print receptiveness or cause stretching when processed reel to reel and as such do not make ideal substrates.

The connection means, which electrically joins the first and second conducting layers, may comprise a co-locating electrical and mechanical means such as male and female connector. Conveniently, the connection means is an area of the first conducting layer which does not have any dielectric layer deposited thereon, typically, such as part of the inductive coil to which part of the second conducting layer can be electrically joined. This connection may be formed by the direct overlapping of conductive inks printed on top of each other. Preferably the connection means is made without the need for a through-hole connection through the substrate and/or dielectric.

The advantage is that when the connection means is formed by the deposition of part of the second conducting layer onto part of the first conducting layer that there are no further processing steps required to complete the circuit. Additional processing steps of folding, crimping or the alignment of subsequent layers takes further time and costly manufacturing steps.

Alternatively the layers may be connected by soldering, electrical adhesives, spot welding, embossing, or by depositing electroless metal onto a seed ink. Conveniently to ensure a good electrical connection between the two conducting layers, the area of contact may be increased by using a protrusion or enlarged area, to create a sufficient contact area.

The dielectric layer may substantially envelope the capacitor plate and the inductive coil in the first layer, preferably the dielectric will cover substantially all of the circuit, provided that the connection means is not covered. The dielectric layer provides a means of electrically isolating the first conductive layer from the second conducting layer and together with part or all of the two conducting layers forms the capacitor of the tuned circuit.

Alternatively, the dielectric may be deposited directly onto the substrate substantially in the pattern of the circuit, by any known pattern transfer mechanism. Conveniently the dielectric may be in the form of a printable ink, which may be deposited by known means. The advantage of depositing the dielectric layer, rather than using the substrate as the dielectric, is that there are an increased number of substrate materials which are available to use. In the manufacture of prior art RF tags the substrates are selected to be rugged, to sufficiently support the circuit and also act as a dielectric. Therefore cheaper and/or more rugged materials may be selected for use as substrates.

Therefore a dielectric may be selected which possesses a low dissipation factor. A further advantage of depositing a dielectric layer comes from the reduced thickness of a deposited or printed dielectric layer compared to the typical thickness of a substrate. The reduction in thickness of the dielectric increases the capacitance value of the deposited capacitor. Therefore this enables capacitor plates with reduced areas to be used to achieve the same values of capacitance. This may lead to a decrease in the overall area of the RF tag.

The dielectric layer may be selected from any suitable insulator material; such materials may be non conducting salts such as for example, inorganic salts or organic salts, organic polymers or composites thereof. Alternatively, the dielectric layer may comprise a metal oxide formed by the oxidation of part of the metal which forms the first conducting layer. In yet a further alternative other non conducting salts derived from the metal of the first conducting layer may be used, such as, for example, halides or oxides. There may optionally be deposited a further dielectric polymer on the metal oxide or metal salt surface.

An organic polymer may be selected from any polymerisable material, preferably the polymer is selected from polyethylene, polypropylene, polystyrene, poly para-xylylene sold under trade name Parylene®, (bis)benzocyclobutene sold under trade name Cyclotene® and polyimides. Conveniently waxes or other monomer or oligomer precursor materials that can be formed into solid polymer layers through UV polymerisation and/or cross-linking may be used. Low dissipation factor polymers may also form blends with less suitable polymers provided the polymer with the low dissipation factor comprises a substantial part of the blend.

The dielectric layer may be deposited at any suitable thickness. Conveniently, the thickness is selected to provide electrical insulation between the first and second conducting layers; preferably the thickness is in the range of from 0.1 microns to 50 microns.

In a preferred arrangement part of the circuit may also contain a means of deactivation comprising a portion of a switch composition whose conducting properties may be changed from an insulating state to a conducting state when the tag is subjected to a strong electric field at or around its resonant frequency (as described in co-pending PCT GB2005/004264).

The switch composition typically comprises a binder and a plurality of conducting particles having an insulating surface layer, wherein substantially all of said particles are in contact with adjacent particles, such that when subjected to an electrical potential, break down of the insulating surface layer creates a conducting path.

The switch composition may be contained within an ink formulation such that it may be deposited by a known pattern transfer mechanism. The switch composition will be located in the circuit such that during normal use the RF tag operates as required, but upon a deactivating stimulus being applied the circuit is caused to short and deactivate the tag or change its resonant frequency.

The switch composition may be located between conducting tracks or may form part of a further connection means between the first and second conducting layers, such as, for example, between the first and second capacitor plates bypassing the inductive coil. In an alternative arrangement the switch composition may be applied over two or more of the coils, such that upon activation the coils are shorted therefore altering the resonant frequency of the tag.

A further advantage of printing a means of deactivation, such as, for example, a switch composition is that there are no additional processing steps required for creating the commonly used deactivation method of employing a weak link in the dielectric layer. The use of the switch composition allows for the manufacture of a complete RF tag by using only deposition means, this minimises the requirement of further mechanical processing steps.

The second conducting layer comprises a second capacitor plate deposited on the dielectric layer which is substantially co-located above the first capacitor plate. The second layer further comprises a connection means to electrically connect to the first conducting layer. In an alternative arrangement the second conducting layer may comprise an inductive coil, this may be in addition to or instead of the inductive coil on the first layer.

The first and second conducting layers may be selected from any suitable electrically conducting material, preferably the material is a metal, metal alloy or carbon, more preferably a metal. The metal may preferably be selected from Cu, Ni, Al, Sn, Au or Ag.

The conducting layers may be deposited in any required thickness suitably in the range of from 0.1 microns to 50 microns.

The deposition technique used for creating the metallic circuit pattern for the first and second layer may be the same or different.

The electrical circuit pattern required for the first conducting layer, such as the connection means, capacitor plate and the inductive coil may be formed directly on the substrate by depositing the conductive material by a pattern transfer mechanism. The methods of depositing metals by a pattern transfer process are known. For example the metal may be deposited as a conductive ink, or such print transfer process may be employed to deposit a seed layer and provide subsequent electroless deposited and optionally electroplated metal tracks and deposits onto the substrate.

In an alternative arrangement the first conducting layer may be deposited substantially over the entire area of the substrate or a substrate which is pre-coated with a thin metal film may be used. The first conducting layer may then be patterned by scribing for example with an ion beam or laser.

Alternatively the dielectric may then be in the form of a printable ink which is deposited directly onto the substrate by a pattern transfer process in the pattern of, the connection means, capacitor plate and the inductive coil, by a pattern transfer mechanism. The dielectric may be selected such that it is capable of forming an etch resist suitable for use in standard photo-resist techniques. The dielectric/etch resist will then allow, by known techniques, the removal of those parts of the conducting layer which is not coated with the dielectric, to form the printed circuit components. Alternatively a known etch resist may be used to create the pattern by known photo-resist techniques, and the dielectric applied to the patterned circuit.

Suitable pattern transfer processes for the deposition of material to form the first and second conductive layers and, where appropriate, the dielectric layer include inkjet or bubble-jet printing, lithography, gravure, xerography, laser printing, tampo printing, silk screen printing or other printing techniques well known in the art.

The second conductive layer may be coated with an inert material to prevent the conducting layer from being damaged. Conveniently the inert material may be a further dielectric material or further substrate material.

The specific design of the inductive coil (antenna) is not critical to the invention, for example the number of coils, their width and thickness may be varied depending on the value of inductance required. Similarly the thickness and area of the capacitor plate may be selected to provide the desired capacitance. For example depending on the thickness and dissipation factor of the dielectric layer the capacitor plates may be small and may be formed from a part of the inductive coil. Other design parameter may vary to achieve the required electrical characteristics.

Alternatively, part of the circuit may be formed by etch resist techniques and other parts of the circuit may be formed by pattern transfer of a conductive ink directly to the substrate. For example, the inductive coil may be formed by an etching process then a conductive ink printed to form the first capacitor plate on the same side.

During the etch procedure it may be possible that minor defects form in the etch/dielectric layer due to the corrosive nature of the solution. Conveniently a further dielectric layer may be deposited on the first dielectric etching layer to effectively seal the original dielectric layer. The etch resist layer itself may also comprise a dielectric with a low dissipation factor.

Typically such RF tags will be preferably produced in large numbers, clearly in those circumstances it may be preferable to use high throughput printing methods.

In a preferred embodiment both the first and second conducting layers are formed by the additive deposition of seed layers and electroless deposition and optionally electrodeposition. This provides the advantage of reel to reel type processes where layers are successively built up without removal of the RF tag assembly from the processing line.

The substrate may be selected from any suitable non conducting material which can support a metal film or can accept a metal seed layer. The substrate need not be such a good insulator as the dielectric layer. The substrate should be chemically inert to both the metal and the processing techniques. The substrate may be rigid or flexible and will be selected depending on the final application of the RF tag. The substrate may conveniently be substantially all or part an article which is to be protected by an RF security tag, such that the article is prepared with the RF tag already located within the article. The material may be selected from any polymer, man made or nature fibre, such as, for example, cloth, paper products, ceramics etc.

In a second aspect of the present invention is provided a substrate carrying at least two RF tags according to the current invention. For example there may be one RF tag on each side of the substrate. This is particularly useful if the tag is used in an environment where there are two different RF frequency fields. Conveniently, the RF tag circuits on either side of the substrate are selected to have different resonant frequencies. In an alternative arrangement the RF tags may be built up in successive layers on only on side of the substrate, by applying an insulating layer over the second conducting layer and then a further first conducting layer, dielectric layer and second conducting layer to form the second tag. This process may be repeated to produce any number of tags sequentially deposited on one or both sides of the original substrate.

According to a third aspect of the invention there is provided a method of producing an RF tag comprising the steps of;

applying to one surface of an electrically non-conductive substrate material a first conducting layer in a predetermined pattern by a pattern transfer mechanism;

applying a dielectric layer over and at least partially covering the first conducting layer;

applying a second conducting layer over the dielectric layer in a predetermined pattern by a pattern transfer method;

providing an electrical contact between the first conducting layer and the second conducting layer;

wherein the first conducting layer, the dielectric layer and the second conducting layer form a tuned RF circuit including at least one coil and at least one capacitor.

According to a fourth aspect of the invention there is provided a method of producing an RF tag comprising the steps of;

applying to one surface of an electrically non-conductive substrate material a first conducting layer in a predetermined pattern by a pattern transfer mechanism;

oxidising the surface of said first conducting layer to form a dielectric layer over and at least partially covering the first conducting layer;

applying a second conducting layer over the dielectric layer in a predetermined pattern by a pattern transfer method;

providing an electrical contact between the first conducting layer and the second conducting layer;

wherein the first conducting layer, the dielectric layer and the second conducting layer form a tuned RF circuit including at least one coil and at least one capacitor.

In an alternative arrangement the step of oxidising the surface may be replaced by a step of converting the surface of said first conducting layer to a substantially non conducting salt, as hereinbefore defined, such as, for example, to a halide.

According to a fifth aspect of the invention there is provided the use of an RF tag according to the invention as hereinbefore described in combination with an RF transmitter and receiver tuned to the resonant frequency of the RF tag, wherein the tag is securely fastened to a body to be monitored, such that in use the location of said tag is detected by the RF receiver.

The RF tag may be fastened to any body, such as for example, consumer items, including clothes, electrical goods, books etc. Further examples, may include tracking devices, such as for car identification, for instance, allowing cars to pass through toll gates or car parks. Alternatively the devices may be secured to an item of clothing or secured to a person, to track people's movement within a controlled area. Particularly for monitoring the movements of children/babies within a secure environment. Alternatively, it may be used to monitor the movements of people to prevent them entering/leaving a defined environment or coming within a predefined distance of an individual.

RF Tags in accordance with the various aspects of the invention may be arranged to be de-activated by the application of an RF field by arranging for a weakness in the dielectric layer (as described for example in U.S. Pat. No. 4,567,473), by providing a fusible link within the circuit (as described for example in U.S. Pat. No. 3,967,161 or U.S. Pat. No. 4,385,524), or by including at a suitable point in the circuit a switch composition which is rendered conducting by the action of the RF field as hereinbefore described or other methods known in the art and the disclosure of these patents and applications is hereby incorporated by reference.

BRIEF DESCRIPTION OF THE DRAWINGS

The invention will be further described with reference to the enclosed drawings in which.

DETAILED DESCRIPTION OF THE DRAWINGS

Figure 1A:
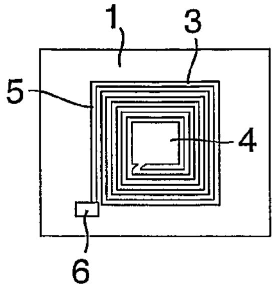
FIG. 1*a* to 1*d* show a top view, and FIGS. 1*e* to 1*g* respectively show a side view of the formation of the RF tag via an etch resist process.
Figure 1B:
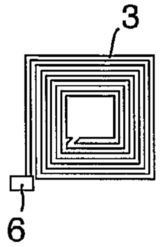
Figure 1C:
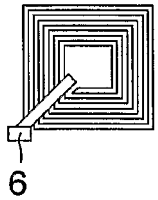
Figure 1D:
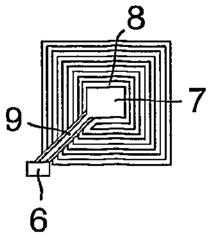
Figure 1E:
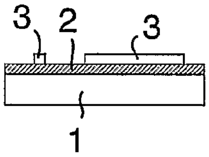

FIGS. 1*a* and 1*e* show a plan view and side elevation view respectively of a substrate 1, with a metal film 2 coated substantially over the area of the substrate 1. A dielectric/etch resistant ink 3 is deposited by a pattern transfer process onto the surface of the metal film 2, in the pattern of a capacitor 4, an inductive coil 5 which additionally functions as the antennae for the circuit, and a connection means 6. The connection means may have a slightly larger surface area than one track-width of the inductive coil 5. FIGS. 1*a* and 1*e* respectively show a single pattern on the substrate, conveniently a plurality of dielectric patterns 3 may be printed onto the surface of the metal 2.

Figure 1F:
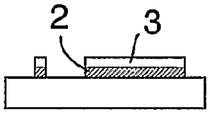

In FIGS. 1*b* and 1*f*, the dielectric ink 3 is subjected to an etch process, which removes the excess metal 2 which is not coated with dielectric ink 3.

Figure 1G:
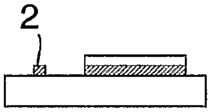
Figure 1H:
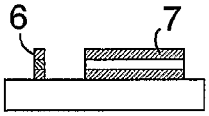

In FIGS. 1*c* and 1*g* the dielectric layer 3 in the corner of the coil 6 is removed either by a chemical or abrasive, thus exposing the metal 2. Conveniently an alternative removable ink other than 3 may be used to coat the connection means 6, such that the removable ink may be easily removed to reveal the connection means 6.

It may be desirable to remove sufficient metal from the edges of the etch profile to leave a protrusion of dielectric. This may be used to prevent for example a printed electrically conductive ink from shorting to the second conducting layer (not shown). Alternatively a second dielectric ink may be printed to seal the pattern (not shown) prior to subsequent deposition of a further conducting layer. Both the etch resist dielectric layer and any subsequent dielectric layer may conveniently comprise materials with a low dissipation factor.

FIGS. 1*d* and 1*g*, show the complete device. The second conductive layer 7 is deposited on dielectric layer 3 to form a capacitor plate 8, which co-locates with capacitor plate 4 (FIG. 1*a*). An electrical connection, preferably in the form of a (busbar) track 9 connects the capacitor plate 8 with the connection means 6 to complete the circuit. Capacitor plate 8 may be the same or different size than the first capacitor plate 4. There may be one or more capacitor plates in the first or second conducting layers.

A second embodiment of this method uses a second printed layer of dielectric ink to overlay parts of the coil 5, to form an insulating bridge from the edge of the capacitor plate and up to but not including the exposed metal in the corner.

FIG. 2

Figure 2A:
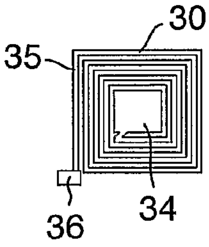
FIG. 2*a* to 2*d* show a top view, and FIGS. 2*e* to 2*g* respectively show a side view of the formation of the RF tag via the pattern transfer of a conductive ink.
Figure 2B:
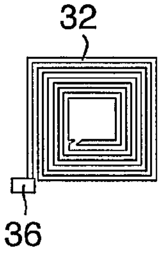
Figure 2C:
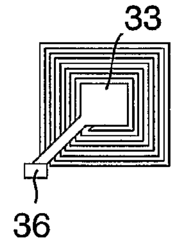
Figure 2D:
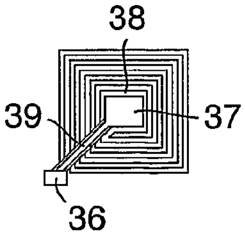
Figure 2E:
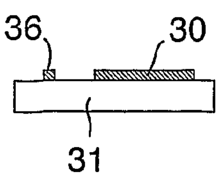

FIGS. 2*a* and 2*e* show a plan view and side elevation view respectively of a substrate 31, with a catalytic seed layer 30, which acts a catalyst to the deposition of electroless metals. The seed layer 30 is deposited onto the surface of substrate 31, by a pattern transfer mechanism in substantially the configuration of a capacitor 34, an inductive coil 35 and a connection means 36. The connection means 36 may have a slightly larger surface area than one track-width of the inductive coil 35.

Conveniently a plurality of catalytic ink patterns 30 may be deposited onto the surface of the substrate 31.

Figure 2F:
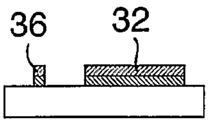

FIGS. 2*b* and 2*f* show an electroless deposition of a metal onto the catalytic seed layer 30, forming a conductive metal layer in substantially the pattern of a capacitor 34, an inductive coil 35 and a connection means 36 No electroless metal is deposited on the remainder of the substrate 31. The electroless deposited metal layer 32 may then be further subjected to either further electroless deposition(not shown) or electrodeposition (not shown), in order to build up a thicker metal layer deposit and reduce the electrical resistance of the circuit.

Figure 2G:
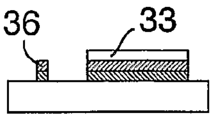

FIGS. 2*c* and 2*g* show the deposition of a dielectric ink 33 by a pattern transfer process onto the surface of the metal film 32, into the pattern of a capacitor 34 and inductive coil 35. The connection means 36 is not coated with the dielectric ink. Alternatively the entire layer 32 may be covered with dielectric ink 33 and the connection means 36 may then be removed either by a chemical or abrasive, thus exposing the metal. Conveniently a removable ink other than 33 may be used to coat the connection means 36, such that the removable ink can be easily removed to reveal the connection means 36.

It may be desirable to add an adhesion promoter (not shown) to the dielectric layer 33 to improve adhesion of the second conducting layer 37.

Figure 2H:
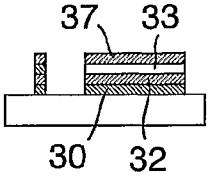

FIGS. 2*d* and 2*h*, show the complete device, with the second conductive layer 37 in place. The second layer 37 is deposited to form a capacitor plate 38, which co-locates with capacitor plate 34 (FIG. 2*b*). The deposition of the second conductive layer 37, may be substantially that as described in FIGS. 1*a* and *b*, using a catalytic seed layer, electroless deposition and optionally electrodeposition. Alternatively the second conducting layer may be formed by hot metal foil stamping to produce the metallic deposits as depicted in FIGS. 2*d* and 2*g* to complete the electrical circuit. A further alternative is to apply the second conducting layer over the entire area of the dielectric and use an etch resist to form the circuit.

An electrical connection, preferably in the form of a (busbar)track 39 connects the capacitor plate 38 to the connection means 36 to complete the electrical circuit. Capacitor plate 38 may be the same size or different size than the first capacitor plate 34. There may be one or more capacitor plates in the first and second conducting layers. Conveniently if the first conducting layer 32 is substantially electrically insulated from the second conducting layer 37 (apart from the connection means 36) then the deposit which forms second capacitor plate 38 and electrical track 39, may substantially cover the entire area of the inductive coil 35 (FIG. 1) and connection means.

SPECIFIC EXAMPLES

Example 1

A screen printing ink (supplied under the trade mark Acheson 6018S) was used as the ink formulation, to which was added titanium dioxide 2 μm at 30% by weight as a filler and silver nitrate 3% by weight. The silver nitrate was pre-dissolved in an aliquot of ethyl lactate/water to aid the transfer and mixing with the screen printing ink. The ink composition was screen printed onto one side of a sheet of polyester in the design of a "checkpoint®" system electronic article surveillance, (EAS), 1-bit tag.

The ink was cured by heating the sample to 80° C. for 10 minutes, causing the ink composition to solidify and adhere to the substrate. At this stage the ink had no electrical conductivity. The printed pattern of cured ink was then immersed into a solution of commercially available Enthone 2130® electroless copper at 46° C. and copper metal deposited to a thickness in the range of from 0.1 to 2 microns onto the printed pattern. An effective EAS tag requires greater than 2 microns of metal owing to low absorption of electromagnetic energy at this frequency and the electrical resistance of the inductor coil. Conveniently the copper thickness on the tag was then increased using electrodeposition to 20 microns. This was achieved by making an electrical connection from the electroless copper layer to the negative terminal of a power supply and a copper rod connected to the positive terminal. When both were placed and held separate in a solution of Enthone cuprostar® copper electroplating solution and a voltage of 0.5 volts applied, then copper electroplated onto the electroless deposited metal.

The dielectric selected was "CYCLOTENE® available from DOW chemical, which is a bisbenzocyclobutene. (BCB) and has a low dissipation factor. This was incorporated into a printable ink formulation such as Acheson 6018S. This ink formulation was screen printed over the first conducting layer pattern to form a dielectric layer. The dielectric layer was dried at ~80 C for 2 hours. The dielectric was applied over the entire area of the first conducting layer, except for a small area which provided the connection means to electrically connect the second layer. The second layer was applied to the dielectric in a similar manner to the first layer.

After electroplating was complete and the metal coated pattern rinsed and dried. It was found to operate as effectively as commercial EAS products, having a resonant frequency of 8.2 MHz and impedance of 10 kiloohms.

Examples 2-4

In the examples a compound of tin $SnCl_2.2H_2O$ was dissolved into ethyl lactate to form an ink formulation of concentration in the range 1-100 millimolar (preferably 2-20 millimolar). Three varieties of this ink formulation were prepared. Example 2 used an inkjet formulation simply using the above prepared solution. Example 3 used an inkjet formulation that additionally comprised an additional 1% by weight ethyl cellulose binder. Both of these inks were printed onto a polyester substrate in the pattern of a first conducting layer of an RF circuit, as shown FIG. 2.

Example 4 used an ink which was prepared by adding the ink formulation to a commercial screen printing ink (the $TiO_2$ based formulation 6018S from Acheson). Additions in the range 1-100 ml of the ink formulation (preferably 10-30 ml) were added to 100 grams of the screen printing paste and mixed in. This screen printing ink formulation was printed onto a polyester substrate and dried at 60° C. for 1 hour.

In each example the inkjet printed and screen printed substrates were dried and then immersed into a dilute intermediate solution made from a palladium salt. This solution was prepared using $PdCl_2$ in the concentration range of 1 millimolar to 0.1 molar dissolved into de-ionised water using a second salt (e.g. ammonium chloride) to aid the process.

The substrates were immersed in this intermediate solution (concentration 10 millimolar) for 10 minutes. The temperature of the intermediate solution was in the range 10-100° C.

Following immersion in the intermediate solution the substrates were dried and then placed into a commercial autocatalytic solution of copper. Copper was found to have been deposited on each substrate only where the pattern of reducing agent had been printed. Where the binder was used in the inkjet ink, the metal had improved adhesion to the substrate.

The resulting patterns were subjected to electrodeposition under standard conditions to increase the thickness of the copper. The dielectric layer was applied onto the electrodeposited layer in the same manner as described in example 1. The second conducting layer was applied to the dielectric layer using the $AgNO_3$ seed catalyst in the same method described in example 1, to form the complete circuit.

After electroplating was complete and the metal coated patterns rinsed and dried. Each example was found to operate as effectively as commercial EAS products, having a resonant frequency of 8.2 MHz and impedance in the range of 10 kiloohms.

The invention claimed is:

1. An RF tag comprising;

an electrically non-conducting substrate having first and second surfaces; comprising a first conducting layer on the first surface of the substrate;

a dielectric layer covering at least part of the first conducting layer; wherein the dielectric layer is a non conducting salt;

and a second conducting layer on the surface of the dielectric layer remote from the first conducting layer, at least partially located above the first conducting layer and electrically connected to the first conducting layer;

wherein the first conducting layer, the dielectric layer and the second conducting layer form a tuned RF circuit including at least one coil and at least one capacitor.

2. An RF tag as claimed in claim 1 wherein the first conductive layer comprises at least a first capacitor plate and at least one connection means to electrically connect to the second conducting layer.

3. An RF tag according to claim 2 wherein the first conducting layer further comprises an inductive coil electrically connected to said first capacitor plate.

4. An RF tag as claimed in claim 3 wherein the dielectric layer substantially covers the first capacitor plate and inductive coil but not the connection means to electrically connect to the second conducting layer.

5. An RF tag as claimed in claim 2, wherein the second conducting layer comprises a second capacitor plate substantially co-located with the first capacitor plate and at least one connection means to electrically connect to the first conducting layer.

6. An RF tag as claimed in claim 1, wherein the dielectric layer is selected from a non-conducting salt formed from the same metal in the first conducting layer.

7. An RF tag as claimed in claim 1, comprising a non-conducting layer covering the second conducting layer.

8. An RF tag as claimed in claim 7 and further comprising a second resonant circuit deposited on the surface of the non-conducting layer remote from the second conducting layer.

9. An RF tag as claimed in claim 5, wherein there is a further connection means between the capacitor plates of said first and second conducting layers, wherein said connection means comprises a switch composition capable of being switched from a non conducting state to a conducting state.

10. An RF tag as claimed in claim 1, additionally comprising a third conducting layer on the second surface of the substrate, a second dielectric layer covering at least part of the third conducting layer; and a fourth conducting layer on the surface of the second dielectric layer remote from the third conducting layer, at least partially located above the third conducting layer and electrically connected to the third conducting layer;

wherein the third conducting layer, the second dielectric layer and the fourth conducting layer form a second tuned RF circuit including at least one coil and at least one capacitor, said second RF circuit tuned to a different frequency from the RF circuit formed from the first conducting layer, the dielectric layer and the second conducting layer.

11. A method of producing an RF tag comprising the steps of;

applying to one surface of an electrically non-conductive substrate material a first conducting layer in a predetermined pattern by a pattern transfer mechanism; causing the surface of said first conducting layer to form a non conducting salt, so as to form dielectric layer over and at least partially covering the first conducting layer;

applying a second conducting layer over the dielectric layer in a predetermined pattern by a pattern transfer method;

providing an electrical contact between the first conducting layer and the second conducting layer;

wherein the first conducting layer, the dielectric layer and the second conducting layer form a tuned RF circuit including at least one coil and at least one capacitor.

12. A method according to claim 11, wherein the dielectric layer is formed by oxidising at least part of the surface of said first conducting layer.

13. A method as claimed in claim 11, wherein the first conducting layer is deposited directly onto the substrate by a pattern transfer mechanism.

14. A method as claimed in claim 11, wherein the first conducting layer is deposited over substantially over the entire area of the substrate.

15. A method according to claim 11, wherein at least one of the first conducting layer and second conducting layer are formed by depositing a seed layer, subjecting said seed layer to electroless deposition and optionally electrodeposition.

16. A method of producing an RF tag comprising the steps of applying to one surface of an electrically non-conductive substrate material a first conducting layer in a predetermined pattern by a pattern transfer mechanism; wherein a dielectric layer is deposited over the first conducting layer by a pattern transfer mechanism, substantially in the pattern of at least one connection means to electrically connect the first conducting layer to the second conducting layer, at least one first capacitor plate and at least one of the inductive coil electrically connected to said first capacitor plate and acts as an etch resist to allow the removal of the conducting layer which is not coated with the dielectric, so as to form a dielectric layer over and at least partially covering the first conducting layer;

applying a second conducting layer over the dielectric layer in a predetermined pattern by a pattern transfer method;

providing an electrical contact between the first conducting layer and the second conducting layer;

wherein the first conducting layer, the dielectric layer and the second conducting layer form a tuned RF circuit including at least one coil and at least one capacitor.

* * * * *